Sept. 30, 1930.   L. MEYER   1,777,216
POLARIMETER INDICATOR
Filed Feb. 11, 1929

Patented Sept. 30, 1930

1,777,216

UNITED STATES PATENT OFFICE

LUDWIG MEYER, OF BERLIN, GERMANY

POLARIMETER INDICATOR

Application filed February 11, 1929, Serial No. 339,214, and in Germany January 20, 1928.

The object of this invention is a polarimeter with device for reading off directly the results in conjunction with the analysis of urine and the determination of optically active substances, without the employment of a vernier which requires a certain routine when ascertaining the result of the measurements.

The device consists in the disposition of four scales upon a drum with which the polarimeter has been provided and which may be made to rotate in various ways, all known in themselves, two of these scales indicating the result in per cent and the other two in angular degrees, rendering the reading of the scales possible through the medium of two window-like gaps situated in front of the graduated drum and also known in themselves.

Figure 1:
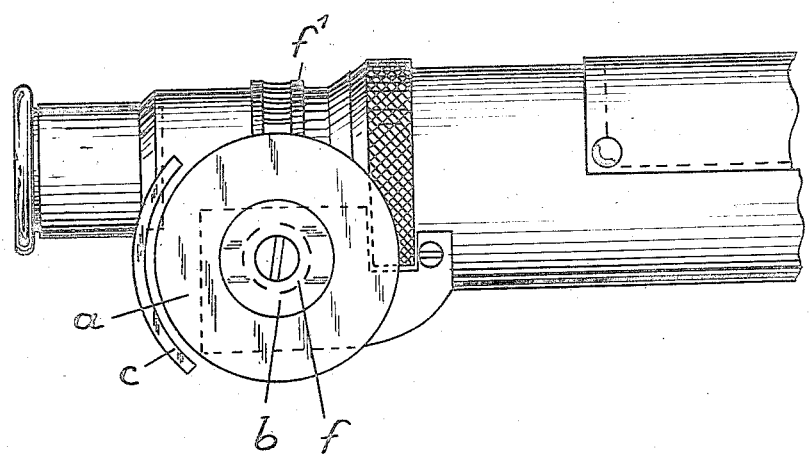
Figure 2:
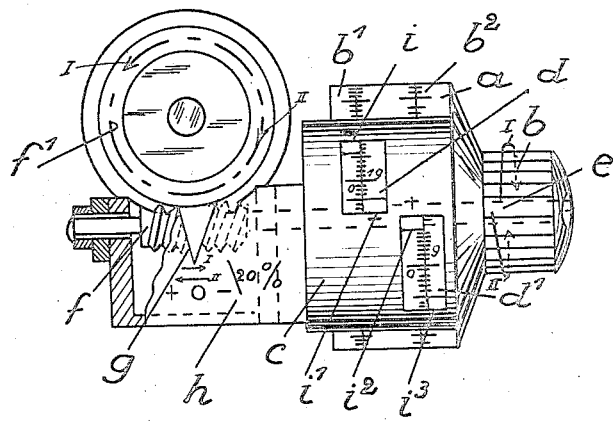

The device has been represented by way of example in the accompanying drawing, in which Fig. 1 is a front-view of a part of the polarimeter with graduated drum, while Fig. 2 is a front-view of the polarimeter with graduated drum attached laterally to the former, being provided with protective plate with two windows.

$a$ indicates the graduated drum equipped with dual scales $b$, $b^1$. $c$ represents a flexed protective plate with two gaps $d$, $d^1$ serving as windows, rendering it possible to read the scales upon the drum $a$. $e$ represents a spindle proceeding from the knob $b$ rigidly connected with the drum $a$, being provided at the other end with a worm $f$ engaging a toothed wheel $f^1$, thereby imparting to the analyzer a rotary motion.

The front-part of the instrument is equipped with an indicator $g$ showing whether a left or a right rotation has been effected. $i$, $i^1$, $i^2$, $i^3$ represents bevelled edges of the windows $d$, $d^1$ facilitating the reading of the scales.

The drum $a$ is graduated as follows:

The scale $b^1$ viewed through the window $d$ upon the left side of the graduated drum serves for reading off the percentage of sugar contained in the urine (plus-side), while the scale on the right side has been provided for ascertaining the percentage of albumen (minus-side). The scale $b^2$, viewed through the window $d^1$ has been divided into whole and $\frac{1}{10}$th degrees and serves for the determination of optically active substances. The plus-side is intended for measuring right-rotating and the minus-side left rotating substances. If the pointer $g$ is pointing from the center line to the plus-sign, the plus-scale should be used for ascertaining the result and this applies, vice versa, to the minus-scale.

Supposing the reading of the sugar percentage scale $b^1$ indicates the fourth $\frac{1}{10}$ division line and the window $d$ shows the whole Figure 2, the result will, in this instance, equal $\frac{3}{4}\%$ of sugar. The plus-rotation is indicated by the pointer $g$. The same applies to rotation in the opposite direction on the minus-side. The modus operandi in conjunction with the scale divided into degree is identical. On either side of the center or zero line there is another line indicating the measuring range of the instrument. $\frac{1}{10}\%$ $\frac{1}{10}°$ may be read off directly with the aid of the drum.

What I claim is:

1. An instrument of the character described, adapted for rotation and comprising a rotatable drum, said drum being provided with dual scales, and each scale having individual sets of graduations; an arcuate plate disposed in fixed position relative to the drum and having visual openings therein adapted to register with each dual scale, the edges of the openings being formed with means operative with each individual set of graduations; and means for rotating the drum relative to the said plate to permit selective readings of each set of graduations corresponding to rotations of said instrument.

2. An instrument of the character described, adapted for rotation and comprising a rotatable drum, said drum being provided with dual scales and each scale having individual sets of graduations; an arcuate plate disposed in fixed position relative to the drum and having visual openings therein adapted to register with each dual scale, the openings being formed with oppositely disposed and alternately arranged beveled edges constituting index means for reading each set of graduations; and means for rotating the drum relative to the said plate to permit selective readings of each set of graduations corresponding to rotation of said instrument.

3. An instrument of the character described, adapted for positive and negative rotation and comprising in combination a toothed wheel integral with the instrument and rotatable therewith; a rotatable drum having dual scales thereon, each scale comprising separate graduations; an arcuate plate disposed in fixed position relative to said drum and having visual openings registering with the graduations, said openings having their edges beveled to form index means for reading said graduations; a spindle carrying said drum and provided with means for rotating the toothed wheel relative to said drum to permit selective readings of the graduations thereon corresponding to positive and negative rotations of the instrument.

In testimony whereof I affix my signature.

LUDWIG MEYER.